United States Patent [19]

Nakazawa et al.

[11] 3,969,899

[45] July 20, 1976

[54] FUEL BURNING APPARATUS AND HEAT ENGINE INCORPORATING THE SAME

[76] Inventors: Sadaharu Nakazawa, 30-8, Nagaham, Kanazawa, Yokohama; Hisashi Izumi, 2-9-1-305, Nishikaigan, Tsuijido, Fujisawa, both of Japan

[22] Filed: Aug. 27, 1974

[21] Appl. No.: 501,088

Related U.S. Application Data

[62] Division of Ser. No. 349,042, April 9, 1973, abandoned.

[30] Foreign Application Priority Data

Apr. 18, 1972 Japan............................... 47-38266

[52] U.S. Cl................................. 60/670; 110/28 R; 110/53; 126/350 R; 126/360 R; 431/171; 431/190
[51] Int. Cl.²........................................ F01K 21/04
[58] Field of Search ............... 110/53, 28; 431/190, 431/171; 126/350, 360; 60/643, 645, 670, 721, 39.55

[56] References Cited
UNITED STATES PATENTS

| 693,221 | 2/1902 | Blount | 110/53 |
| 3,229,462 | 1/1966 | Fatica | 60/39.55 |
| 3,693,347 | 9/1972 | Kydd et al. | 60/39.55 |

*Primary Examiner*—Allen M. Ostrager

[57] ABSTRACT

For the purpose of eliminating toxic compounds from exhaust gases emitted from fuel burners, boilers, furnaces and heat engines, an improved fuel burning apparatus is proposed in which fuel is combusted in the presence of a hot mixture of water vapor and oxygen gas produced through catalytic exothermic decomposition of hydrogen peroxide. The fuel burning apparatus will find numerous practical applications, preferred ones of which include provision in steam engines, gas and steam hybrid power plants and turbines.

14 Claims, 10 Drawing Figures

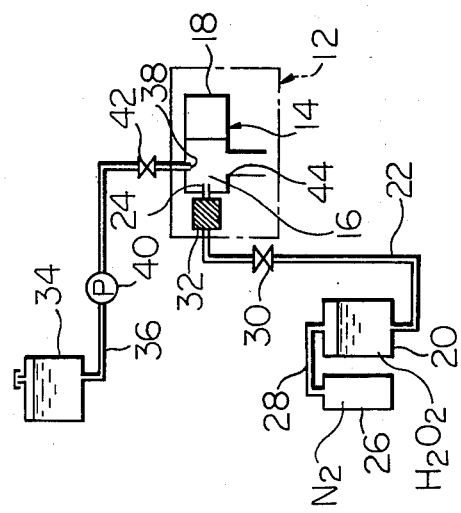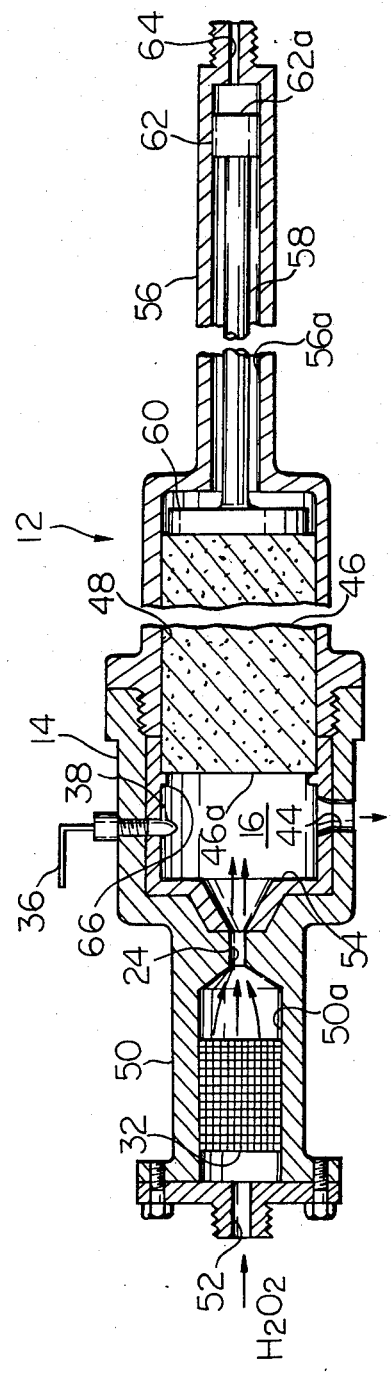

FUEL BURNING APPARATUS AND HEAT ENGINE INCORPORATING THE SAME

This is a division of application Ser. No. 349,042, filed Apr. 9, 1973, now abandoned.

The present invention relates to fuel burning apparatus and more particularly to fuel burning apparatus in which emission of toxic compounds is eliminated or reduced to a minimum. The invention is also concerned with heat engines using such fuel burning apparatus.

Toxic chemical compounds contained in exhaust gases emitted from fuel burning apparatus and heat engines presently in common use include unburned hydrocarbons, carbon monoxide and nitrogen oxides, and provide a major cause of contamination of air in urban and even suburban areas. A variety of devices have thus far been proposed and put into practice in an effort to eliminate toxic compounds from exhaust gases, especially from automotive internal combustion engines and industrial and household burners, furnaces boilers and other processing equipment. For the purpose of eliminating unburned hydrocarbons and carbon monoxide from exhaust gases, means have been developed to achieve complete or more efficient combustion of fuel, or to re-oxidize or "afterburn" exhaust gases while they are being passed through an exhaust passage of the fuel burning equipment or heat engine. However, complete combustion of fuel or re-oxidization of exhaust gases result in the formation of nitrogen oxides and therefore, various attempts have been made to provide an effective compromise between the mutually conflicting requirements for eliminating carbon monoxide and unburned hydrocarbons, and eliminating nitrogen oxides from exhaust gases.

It is, however, apparent that in prior art equipment employing fuel burning means, these requirements can not be perfectly fulfilled in that fuel is combusted in combination with air which is a source of nitrogen and oxygen which can combine to form nitrogen oxides.

The present invention contemplates provision of a new and useful fuel burning apparatus and a heat engine incorporating the fuel burning apparatus in which fuel is combusted in combination with an oxidizing gas not containing nitrogen, so that exhaust gases emitted from the engine are perfectly clear of toxic nitrogen oxides. Since the oxidizing gas for the fuel does not contain nitrogen, fuel can be burned at an increased combustion efficiency or high temperature so that the exhaust gases emitted from the fuel burning apparatus or an engine using such an apparatus can be free from not only nitrogen oxides, but also carbon monoxide and unburned hydrocarbons which would otherwise result from incomplete combustion of fuel.

The present invention thus proposes to use liquid hydrogen peroxide ($H_2O_2$) as an oxidizing agent for the fuel. The hydrogen peroxide is exothermically decomposed in the presence of a catalyst of, for example, a silver-based material, into water and oxygen as follows:

$$H_2O_2 \rightarrow H_2O + \tfrac{1}{2}O_2.$$

This exothermic decomposition of hydrogen peroxide is accompanied by generation of heat such that temperature of the resulting gas mixture reaches about 700°C. The hot gaseous mixture of water vapour and oxygen produced in this manner contains nascent oxygen in a copious amount such that the mixture has extremely high chemical activity. Thus, if this mixture is brought into contact with a fuel which may be gasoline, heavy oil, kerosene or liquefied petroleum gas, the fuel will be rapidly combusted through the following reaction:

$$H_2O + \tfrac{1}{2}O_2 + C_nH_m \rightarrow H_2O + CO_2,$$

wherein $C_nH_m$ is a general representation of a hydrocarbon fuel. The combusted gases produced through this reaction are perfectly clear of nitrogen oxides and since the temperature of the combusted gases usually reache a level within a range of 2,000°C to 2,300°C which is more than enough to achieve complete combustion of fuel, the exhaust gases contain substantially no unburned hydrocarbons or carbon monoxide.

The heat produced as a result of this combustion is usually excessive and the volume of the combusted gases is insufficient for producing power efficiently in an internal combustion engine or for satisfactorily heating water in a steam engine. This heat will, moreover, cause overheating of an internal wall of a combustion chamber and any parts directly exposed to the combusted gases, inviting serious damage or deterioration of various working parts of the fuel burning apparatus or equipment which may be combined with the burning apparatus. The combusted gases should therefore be diluted with a supplementary fluid so that the temperature of the working gases is reduced to an appropriate level, and at the same time the total volume of the working gases should be augmented. In prior art fuel burning equipment or heat engines incorporating the equipment, copious amounts of air are used as the supplementary fluid thus necessitating the provision of heavy-duty blowers which are responsible for a large-sized configuration of the fuel burning equipment or heat engine, and for a reduction in output power. The present invention therefore proposes, as a preferred embodiment, to use water as a diluting fluid for the combusted gases. This water is injected at a controlled rate into the gases produced as a result of combustion of fuel in the presence of oxygen and water vapour produced through decomposition of hydrogen peroxide, and is rapidly vapourized, thereby reducing the temperature of the gas mixture and increasing the total volume of working gases. Since water used in this type of application has a high cooling potential due to its latent heat of vapourization, it may used effectively in a comparatively small amount, thus allowing a sobstantial reduction in the size and capacity of the feeding means.

Because of the high temperature of the gases produced by the exothermic decomposition of hydrogen peroxide, a fuel burning apparatus of the general character above described and a heat engine using such an apparatus may be operable on fuels of any kind including liquid fuels such as gasoline, kerosene, and light or heavy oil, gaseous fuels such as liquefied petroleum or hydrogen gas and solid fuels such as are specially formulated from plastic products. When fuels of relatively low cost are utilized, the cost of the hydrogen peroxide will be offset so that the total cost of the fuel for the operation of a fuel burning apparatus or heat engine using the apparatus will be comparable to or even lower than the cost associated with prior art combustion equipment operating on mixtures of high-quality hydrocarbon fuels and air.

It is, thus, an object of the present invention to provide a new and useful fuel burning apparatus which achieves complete combustion of fuel in combination with an oxidizing gas which does not contain nitrogen.

It is another important object of the invention to provide a new and useful fuel burning apparatus in which fuel is combusted in the presence of hot gases produced as a result of exothermic decomposition of hydrogen peroxide, so that an essentially negligible amount of toxic compounds such as carbon monoxide, unburned hydrocarbons or nitrogen oxides are emitted from the apparatus, even though the fuel used may be of a relatively low quality.

It is still another important object of the present invention to provide a new and useful fuel burning apparatus which is capable of producing working gases having a volume and temperature which can be controlled in a simple manner.

It is yet another object of the invention to provide a new and useful fuel burning apparatus having a simple and small-sized configuration which is highly compatible with industrial and household combustion equipment such as heat engines, boilers and furnaces.

As will be understood from the following detailed descriptiin, these and other objects of the present invention will be accomplished generally in a fuel burning apparatus which comprises, in combination, a combustion chamber, a fuel feeding means for feeding fuel into the combustion chamber, an oxidizer feeding means for feeding into said combustion chamber hot oxidizing gases produced through exothermic decomposition of hydrogen peroxide said fuel being burned in the presence therewith in said combustion chamber, and supplementary fluid feeding means for injecting supplementary fluid into said combustion chamber for producing working gases of predetermined temperature and volume. To accelerate exothermic decomposition of hydrogen peroxide into hot oxidizing gases, the fuel burning apparatus of the above described configuration may further comprise a catalyst of, for example, a silver-based material.

In accordance with the present invention, a fuel burning apparatus having a general configuration above described is preferably incorporated into a heat engine such as a steam engine or a steam and gas hybrid power plant to exploit the advantages of the fuel burning apparatus, in which the temperature and volume of the working gases can be readily regulated over a considerably wide range and complete combustion of fuel can be achieved without production of toxic nitrogen oxides.

It is, therefore, further and another object of the present invention to provide a new and useful heat engine incorporating a fuel burning apparatus having the above described general configuration. A heat engine of this nature will comprise a combination of an above described fuel burning apparatus, an evaporator unit including an evaporation chamber having a gas inlet port communicating with a combustion chamber of the burning apparatus for directing hot working gases into the evaporation chamber, at least one pipeline passing through the evaporation chamber, water feeding means for feeding water into the pipeline for producing steam in the pipeline through exchange of heat between water in the pipeline and working gases in the evaporation chamber, and a steam expansion unit leading from an outlet of the pipeline for allowing steam to expand and produce driving power. Steam which has thus expanded and lost pressure may be discharged to the open air or, where desired, may be recirculated through a condenser through the water feeding means and into the pipeline in the evaporator unit. Gases in the evaporation chamber may also be discharged to the open air or, since these gases consist essentially of water vapour and carbon dioxide, the carbon dioxide gas may be discharged to the atmosphere and the water recirculated through the water feeding system.

The evaporator unit may be formed of or protected by standard refractory materials since working gases introduced into the unit have been cooled to a suitable temperature through injection of supplementary fluid into the combusted gases. The supplementary fluid may be atmospheric air or water, although the latter is preferred for the reasons previously explained. Where, however, the evaporator unit is formed of or protected by materials having especially high thermal resistance, the combusted gases may be passed directly into the evaporator unit without addition of supplementary fluid depending upon the application of the heat engine.

A copious amount of water vapour forms as a result of the decomposition of hydrogen peroxide and the combustion of fuel in the presence of water as can be readily understood from the chemical formulae previously shown. Since the hot working gases produced in a fuel burning apparatus of the described character thus contain copious water vapour, the working gases may be utilized directly as a fluid to act upon a work producing member of an engine. Where this arrangement is preferred, the heat engine may dispense with the evaporator unit, and the hot working gases produced by dilution of combusted gases may be directly passed to the expansion unit. Expended water vapour or steam may be discharged to the open air or recirculated to the supplementary fluid feeding means of the fuel burning apparatus through a condenser and, preferably, also through a separator by means of which carbon dioxide gas contained in the steam is discharged to the atmosphere. A heat engine of a configuration above described will be advantageous especially in applications involving severe space requirements because an evaporator unit, which is generally large in size, is not utilized.

A fuel burning apparatus according to the present invention may be incorporated into a gas turbine engine in such a way that hot combusted gases produced by the apparatus may be utilized to drive a turbine rotor without addition of supplementary cooling and diluting fluid. Since, in this instance, the combusted gases from the fuel burning apparatus have a temperature of approximately 2,000°C as previously mentioned, it is generally required that expansion and utilization of these gases be accomplished in stages through the use of a complex energy conversion mechanism, and that components to be exposed to these gases be formed of selected refractory materials, necessitating an enlarged and costly turbine engine configuration. To avoid these problems and to achieve sufficiently high efficiency in utilizing the heat of the gases produced by a fuel burning apparatus of the described character, the present invention further contemplates provision of a new and useful steam and gas hybrid power plant in which part of the thermal energy of the gases produced in a combustion chamber of a fuel burning apparatus is used for driving a gas turbine, and part for driving a steam turbine. For this purpose, a hybrid power plant may comprise an internal combustion engine including a gas expansion unit communicating directly with the combustion chamber of the fuel burning apparatus for causing hot gases from the combustion chamber to expand and produce energy for driving a gas turbine, and an external combustion or steam engine including an evaporator unit incorporated with the combustion chamber of the fuel burning apparatus for receiving heat from the combustion chamber, water feeding means for feeding water into the evaporator unit for producing steam, and a steam expansion unit leading from an outlet of the evaporator unit for allowing the steam to expand and produce energy for driving a steam turbine.

The features and advantages of the fuel burning apparatus and a heat engine using the fuel burning apparatus in accordance with the present invention will become more apparent from the following description taken in conjunction with the accompanying drawings in which like reference numerals and characters designate corresponding parts throughout the figures and in which:

FIG. 1 is a schematic view which shows a general constructional arrangement of a fuel burning apparatus according to the present invention;

FIG. 2 is a longitudinal sectional view which illustrates a preferred configuration of a combuster unit forming part of a fuel burning apparatus having the general constructional arrangement shown in FIG. 1;

Figure 3:
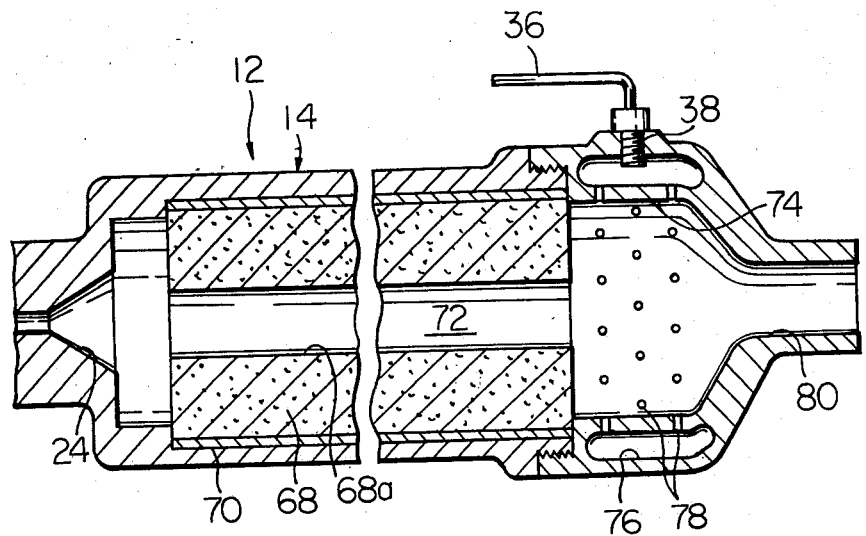
FIG. 3 is a view similar to FIG. 2 but shows a modification of the combuster unit illustrated in FIG. 2.

Reference will now be made to the drawings, first to FIG. 1. As illustrated in FIG. 1, a fuel burning apparatus according to the present invention generally includes a combuster unit 12 which comprises a combustion cylinder 14. The combustion cylinder 14 is provided with a combustion chamber 16 and a fuel feeding means 18. The fuel feeding means 18 may be constructed and arranged in any desired manner depending upon the type and state of the fuel used. The fuel is thus fed continuously or in cycles into the combustion chamber 16, and is burned in the presence of hot oxidizing gases which are injected into the combustion chamber 16 by oxidizer feed means which are arranged in a manner to be described below.

The oxidizer feed means include a container 20 which stores therein hydrogen peroxide ($H_2O_2$) in a liquid state. The hydrogen peroxide container 20 has formed at its bottom an outlet leading into a conduit 22 which communicates with the combustion chamber 16 through a catalyst means 32 which will be described below and injection nozzle 24. Suitable pressurizing means are provided to cause the liquid hydrogen peroxide to flow out of the container 20. Such pressurizing means are herein shown as comprising a container 26 storing therein a pressurized inert gas such as nitrogen gas. Nitrogen gas in the container 26 is directed through a passageway 28 into an upper region of the container 20 so that the liquid hydrogen peroxide is constantly urged to flow into the conduit 22 by the pressure of the nitrogen gas which is in contact with the surface of the liquid hydrogen peroxide in the container 20. The conduit 22 is provided with a flow control valve 30 such that when the valve 30 is open, liquid hydrogen peroxide issuing from the container 20 is injected through the oxidizing gas injection nozzle 24 into the combustion chamber 16 at a rate which is controlled by the valve 30. Hydrogen peroxide thus directed into the combustion chamber 16 is exothermically decomposed into a hot mixture of water vapour and oxygen which reaches a temperature of approximately 700°C as previously noted. Such exothermic decomposition of hydrogen peroxide is accelerated by a catalyst means which may comprise a catalyst 32 of, for example, a silver-based material which is positioned immediately upstream of the injection nozzle 24.

Fuel fed into the combustion chamber 16 by the fuel feeding means 18 is thus induced to combust by the heat of the hot oxidizing gases so as to produce combusted gases in the combustion chamber 16. It is, in this instance, to be noted that the oxidizing gases have a temperature of about 700°C which is sufficient that combustion of fuel can be brought about without aid of any positive igniting means.

Combusted gases produced in this manner are usually not operable as working gases because of their excessively high temperature of approximately 2,000°C to 2,300°C, and because of their relatively low volume. In accordance with the present invention, therefore, hot combusted gases are diluted with a supplementary fluid so that the temperature of the working gases is reduced to an appropriate level, and at the same time the total volume of the working gases is augmented to a value which is predetermined depending upon the application of the fuel burning apparatus. As a supplementary fluid used to dilute combusted gases, atmospheric air may suit the purpose, but water is preferred due to its latent heat of vapourization, and because a pump or blower of considerably large capacity is required for injecting a sufficient amount of air into the combustion chamber if air is utilized as a supplementary fluid, as previously mentioned.

Thus, a fuel burning apparatus according to the present invention further comprises a supplementary fluid and feeding means which include a container 34 to store water therein. A water feed conduit 36 leads from the bottom of the water container 34 and communicates with the combustion chamber 16 through at least one water injection nozzle 38. Water is caused to flow out of the water container 34 either by gravity, or where desired, by a water feed pump 40 incorporated in the conduit 36 between the container 34 and the water injection nozzle 38 so that water in the container 34 is forcibly fed into the combustion chamber 16. Water is injected into the combustion chamber 16 at a rate which is controlled by a flow control valve 42 which is located between the water feed pump 40 and the water injection nozzle 38. Water injected into the combustion chamber 16 is rapidly vapourized and admixed with combusted gases produced by oxidization of fuel from the fuel feed means 18. The resultant working gases are discharged from the combustion chamber 16 through an outlet port 44 which is formed in a wall of the combustion cylinder 14.

Figure 4:
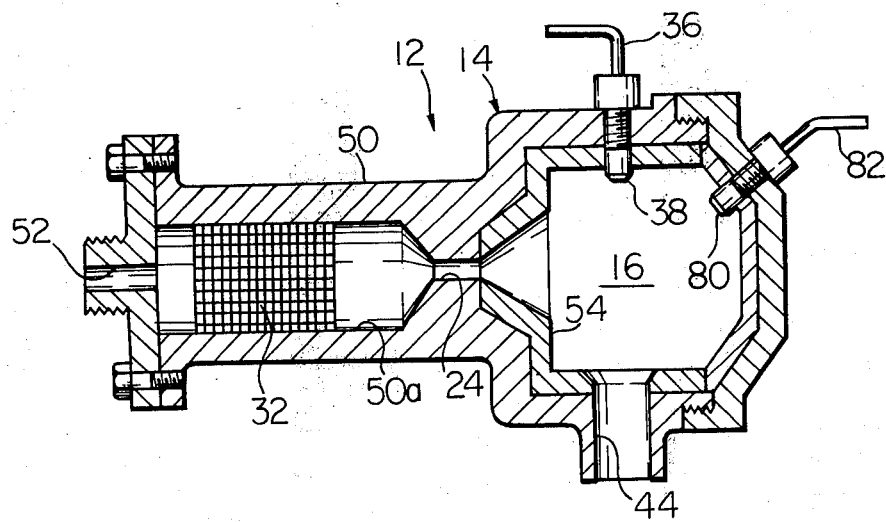
FIG. 4 is also similar to FIG. 2 but shows another modification of the combuster unit shown in FIG. 2.

Some preferred configurations of the combuster unit 12 forming part of the fuel burning apparatus above described are illustrated in FIGS. 2 to 4.

Referring to FIG. 2, a preferred configuration of the combuster unit 12 is shown as utilizing a solid hydrocarbon fuel which is in the form of a molded rod. A solid fuel rod may be made from waste plastic products such as plastic containers so that not only the pollution resulting from combustion of the hydrocarbons but also an accumulation of waste plastic products is thereby eliminated.

A rod of solid fuel 46 is stored in a fuel chamber 48 which is formed next to the combustion chamber 16 in the combustion cylinder 14. Ths solid fuel 46 is axially slidably received in the fuel chamber 48 and has a leading end face 46a exposed to the combustion chamber 16. The combustion cylinder 14 has an extension 50 projecting from an outer end of the combustion chamber 16. An extension 50 has formed therein a bore 50a which is in communication at one end with a conduit 22 from a hydrogen peroxide container 20 (FIG. 1) through an inlet port 52 formed at an upstream end of the combustion cylinder 14. The bore 50a communicates at the other end with the combustion chamber 16 through a hydrogen peroxide injection nozzle 24. A catalyst 32 is accommodated within the bore 50a so that liquid hydrogen peroxide which is fed into the bore 50a from the conduit 22 is exothermically decomposed thus producing hot oxidizing gases of water vapour and oxygen, this reaction being accelerated by the catalyst 32 as previously mentioned. The hot oxidizing gases thus produced are then injected into the combustion chamber 16 through the injection nozzle 24. Oxidizing gases thus admitted to the combustion chamber 16 iminge upon the leading end face 46a of the solid fuel 46 in the fuel chamber 48 such that combustion is produced at the leading end face 46a of the solid fuel 46 with the result being a copious amount of hot combusted gases which are admixed with water which is fed into the combustion chamber 16 from a water injection nozzle 38 which communicates through a conduit 36 with a water container 34 (FIG. 1). The resulting gases are at a suitably low temperature and of a sufficiently high volume to provide useful work energy for a heat engine, and are discharged from an outlet port 44.

To protect the combustion cylinder 14 from the heat of the combusted gases, the combustion chamber 16 may preferably be lined with a refractory layer 54 of porous ceramic, porcelain or sintered alloy material. Although the combuster unit 12 above described has been assumed to have only one water injection nozzle 38, the combuster unit 12 may be provided with two or more water injection nozzles 38 communicating with the container 34.

The solid fuel 46 is constantly fed toward the combustion chamber 16 so that the leading end face 46a thereof is constantly exposed to oxidizing gases being injected into the combustion chamber 16 from the injection nozzle 24. FOr this purpose, the combustion cylinder 14 has a tubular extension 56 which projects from an outer end of the fuel chamber 48. The tubular extension 56 is formed with an elongated bore 56a which is in communication at its inner end with the fuel chamber 48. A piston rod 58 axially movably extends through the elongated bore 56a and projects at its innermost end into the fuel chamber 48. The piston rod 58 carries at its inner end a contact member 60 which is in contact with an outer or rear end face of the solid fuel 46 and is axially slidably received in the fuel chamber 48. The piston rod 58 further carries at its outer end a spool 62 which is axially slidably received in the bore 56a of the tubular extension 56. The bore 56a of the tubular extension 56 communicates at its end most distant from the fuel chamber 48 with a passageway 64 leading to a source of pressurized fluid (not shown) which may be a pneumatic pump or which may utilize water stored in the water container 34 (FIG. 1). The fluid pressure thus acts on a rear or outer face 62a of the spool 62 so that the piston rod 58 is pushed toward the solid fuel 46 and accordingly the solid fuel 46 is constantly fed toward the combustion chamber 16 as the solid fuel 46 is burned and consumed at its leading end face 46a. To prevent the solid fuel 46 from advancing excessively into the combustion chamber 16, an annular projection or stop member 66 may be formed at a junction between the combustion chamber 16 and fuel chamber 48 so that the end face 46a of the solid fuel 46 is mechanically stopped by the stop member 66. Although not shown, the combustion cylinder 14 is constructed so as to provide an access to the fuel chamber 48 for inserting a rod of solid fuel 46 to replace one which was consumed as the result of normal burning operation.

Referring now to FIG. 3, another preferred configuration of a combuster unit 12 is shown as utilizing a solid hydrocarbon fuel of generally tubular shape. A tubular fuel 68 in FIG. 3 has a bore 68a extending through its length about its longitudinal axis, and is slidably received in a combustion cylinder 14, preferably by means of a refractory lining 70. The periphery of the bore 68a in the tubular fuel 68 defines a combustion chamber 72 which is in communication at one end through a conduit 22 with a hydrogen peroxide container 20 (FIG. 1) through an oxidizer injection nozzle 24 which is formed at an upstream end of the combustion cylinder 14. The combustion chamber 72 opens at its other end into a mixing chamber 74 which is formed within a downstream end portion of the combustion cylinder 14. Hot oxidizing gases resulting from exothermic decomposition of hydrogen peroxide are thus injected into the combustion chamber 72 so that the solid tubular fuel 68 is burned at the surface of its bore 68a which defines the combustion chamber 72. Hot combusted gases produced in this manner are delivered into the mixing chamber 74.

In a wall of a downstream end portion of the combustion cylinder 14, an annular water distribution passageway 76 is formed surrounding the mixing chamber 74. The annular passageway 76 communicates with the mixing chamber 74 through a multiplicity of apertures 78 which are formed and uniformly distributed in a wall portion between the chamber 76 and the mixing chamber 74. The water injection nozzle 38 communicating with the water container 34 (FIG. 1) through the conduit 36 as previously mentioned projects into the water distribution passageway 76 so that water delivered from the container 34 is forced into and distributed throughout the passageway 76 and expelled into the combusted gases in the mixing chamber 74. The combusted gases are consequently cooled to a suitable temperature and expanded to a predetermined volume, and are discharged from the mixing chamber 74 through an outlet port 80 which is formed at a downstream end of the combustion cylinder 14.

The combuster unit 12 above described features, as compared with a combuster unit 12 of a construction shown in FIG. 2, an increased surface area of solid fuel exposed to combustion and will, therefore, suit the purpose of producing a copious volume of combusted gases. Thus, a fuel burning apparatus incorporating a combuster unit 12 of a configuration shown in FIG. 3 will prove advantageous for use in a heat engine in which rapid response to acceleration conditions and high power output for heavy loading conditions are required.

FIG. 4 illustrates a third preferred example of a configuration of a combuster unit 12 of the fuel burning apparatus shown in FIG. 1. Differing from combuster units 12 of configurations shown in FIGS. 2 and 3, the combuster unit 12 herein illustrated utilizes a liquid or gaseous fuel such as heavy or light oil, kerosene, gasoline, and liquefied petroleum or hydrogen gas.

Similar to a combuster unit 12 shown in FIG. 2, a combustion cylinder 14 of the combuster unit 12 illustrated in FIG. 4 has an extension 50 which is formed with a bore 50a so as to accommodate therein a catalyst 32 for promoting exothermic decomposition of liquid hydrogen peroxide passed thereto through an inlet port 52. Hot oxidizing gases produced downstream of the catalyst 32 are delivered into a combustion chamber 16 through an injection nozzle 24. A fuel injection nozzle 80 projects into the combustion chamber 16, communicating with a source (not shown) of liquid or gaseous fuel through a fuel feed conduit 82 for delivering fuel into the combustion chamber continuously or in cycles. Fuel is ignited by hot oxidizing gases injected into the combustion chamber 16 through the nozzle 24 and the resulting combusted gases are diluted with water injected into the combustion chamber 16 through a water injection nozzle 38 which communicates through a conduit 36 with a water container 22 (FIG. 1). The combustion chamber 16 is shown as being lined with a refractory layer 54 for protection from heat generated in the combustion chamber 16 as a result of combustion of fuel therein. Working gases having attained a suitable temperature and volume are discharged from the combustion chamber 16 through an outlet port 44 formed in the combustion cylinder 14 similar to that of the combuster unit 12 of a configuration illustrated in FIG. 2.

From the foregoing description, it will be appreciated that a fuel burning apparatus herein proposed achieves combustion of fuel at a sufficiently high temperature and without combination with oxidizing gases containing nitrogen so that exhaust gases emitted from the apparatus are completely clear of unburned hydrocarbons and carbon dioxide resulting from incomplete combustion of fuel, and of toxic nitrogen oxides resulting from the existence of nitrogen in oxidizing gases used with the fuel. Combusted gases produced attaining an excessively high temperature are diluted with water so that the resultant working gases have a temperature and volume which can be controlled accurately and easily through variation of the water supply rate to the combusted gases.

Working gases discharged from a combustion unit of a fuel burning apparatus according to the present invention may be used to heat water in a boiler or evaporator of a steam engine, or to provide energy for a gas powered heat engine such as a gas turbine.

Figure 5:
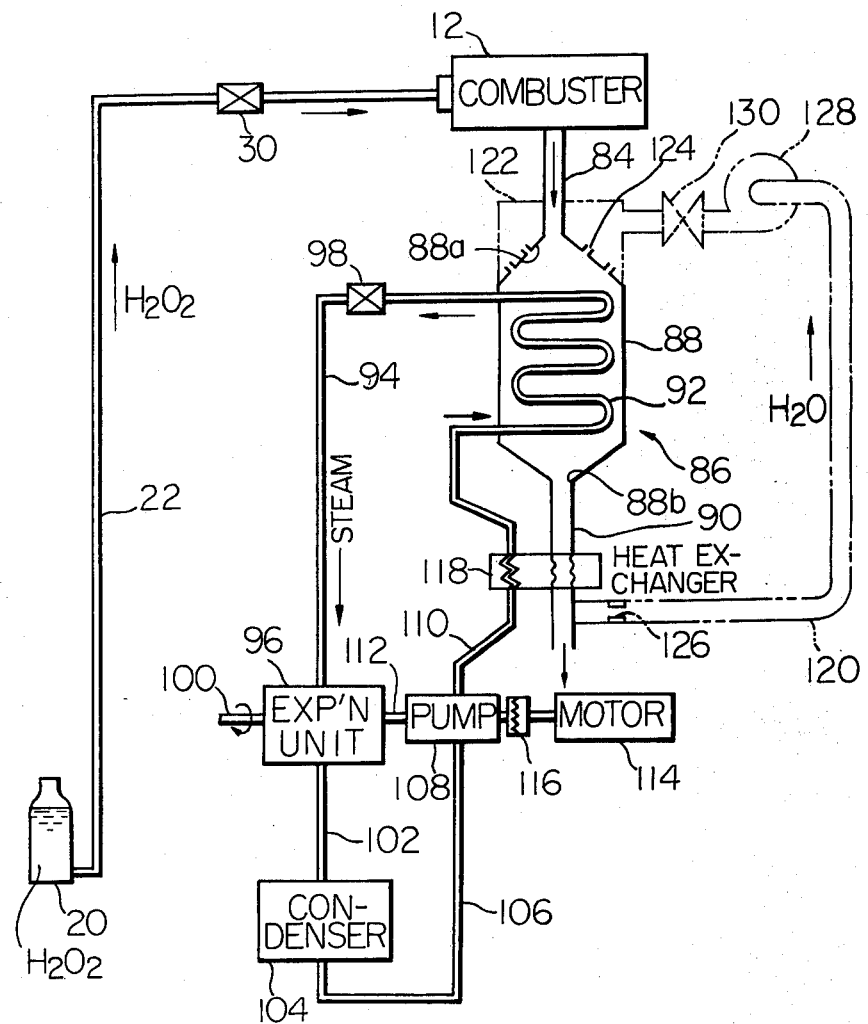
FIG. 5 is a schematic view showing a steam engine incorporating a fuel burning apparatus having the general constructional arrangement shown in FIG. 1.
Figure 6:
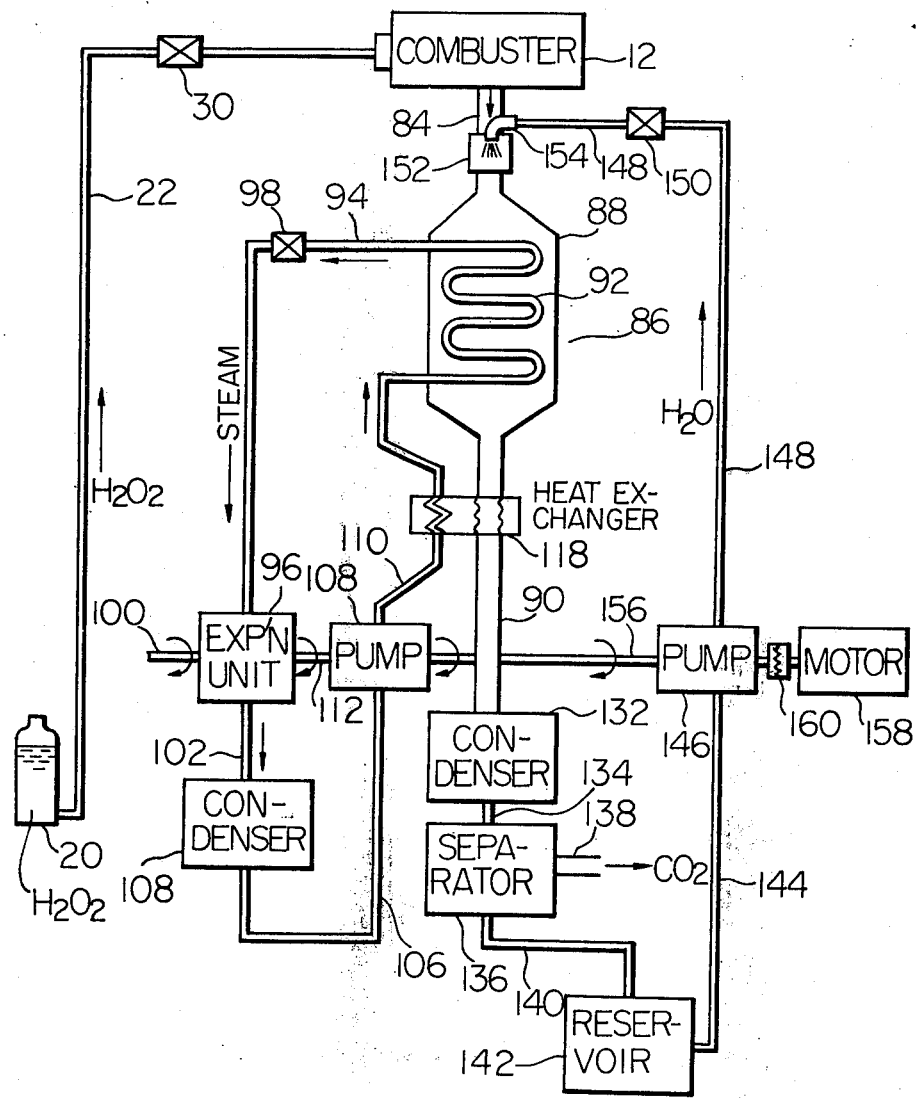
FIG. 6 is a view similar to FIG. 5 but shows a modification of the steam engine illustrated in FIG. 5.
Figure 7:
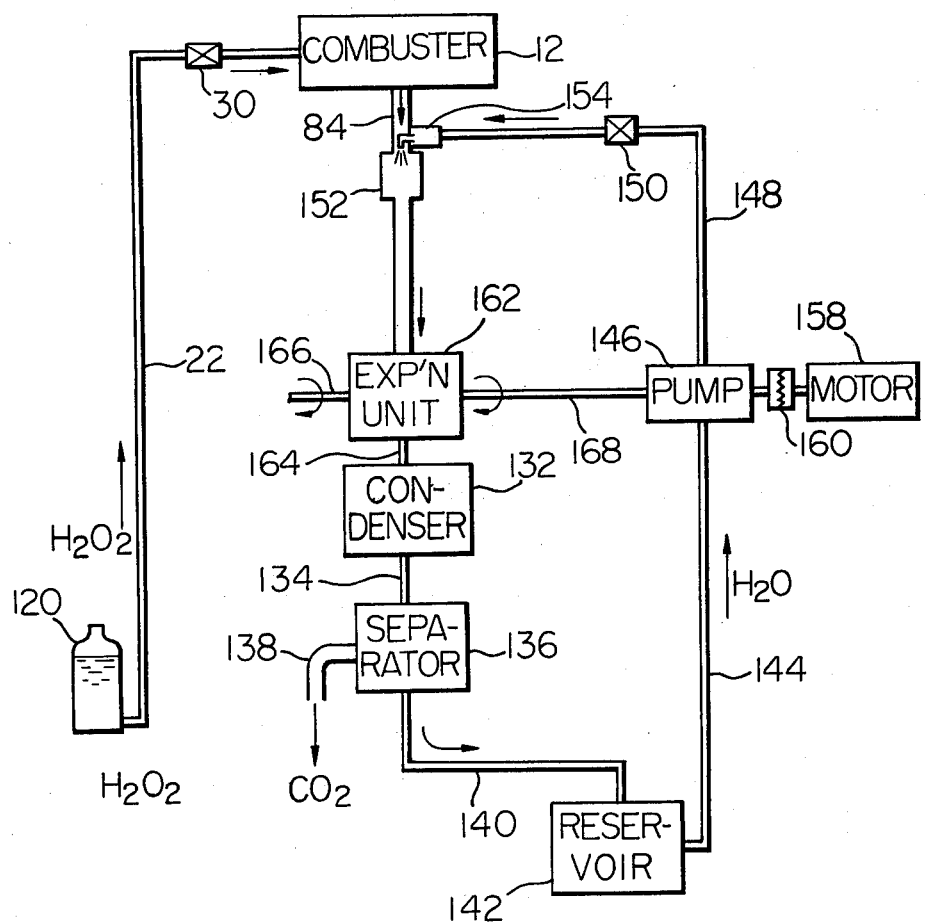
FIG. 7 is also similar to FIG. 5 but illustrates another modification of the steam engine shown in FIG. 5.

FIGS. 5 to 7 illustrate preferred examples of arrangements in which a fuel burning apparatus thus described is incorporated in a steam engine.

Referring to FIG. 5, a combuster unit 12 may be of a configuration illustrated in any of FIGS. 2 to 3, or may be a modification of a configuration therein shown. The combuster unit 12 is supplied with liquid hydrogen peroxide from a hydrogen peroxide container 20 through a conduit 22 which may incorporate a flow control valve 30. Liquid hydrogen peroxide in the container 20 is constantly caused to flow out of the container 20 by feeding means which are not shown at a rate which is controlled by the flow control valve 30. Hydrogen peroxide entering the combuster unit 12 is exothermically decomposed in the presence of a catalyst of, for example, a silver-based material, and produces a hot mixture of water vapour and oxygen. Combusted gases thus produced are mixed with water which is fed into the combuster unit 12 from a suitable source (not shown), and the resultant working gases having a predetermined temperature and volume are discharged from the combuster unit 12 into a duct 84 leading from an outlet port (not shown) of the combuster unit 12, the duct 84 being formed of or protected by a suitable heat-resistant material.

An evaporator unit 86 includes a casing 88 which has a gas inlet port 88a communicating with the duct 84, and an exhaust outlet port 88b which opens to the atmosphere through an exhaust tube 90. A heat-exchange pipeline 92 passes in the form of a tube nest through the interior of the casing 88. Water is fed by means of a feeding means to be described below into the pipeline 92, and is transformed into steam as it circulates through the pipeline 92 due to exchange of heat between water in the pipeline 92 and hot working gases discharged into the casing 88 from the combuster unit 12 through the duct 84 and inlet port 88a of the casing 88. Steam thus produced is passed through a steam feed pipeline 94 into a steam expansion unit 96 at a rate which is controlled by a pressure regulator valve 98 incorporated in the pipeline 94. Steam introduced into the expansion unit 96 is allowed to adiabatically expand so as to develop power for driving a device such as a turbine which is not shown in detail but is incorporated within the expansion unit 96 for the purpose of obtaining useful mechanical output power from the steam engine being described, this output power being provided in the form of rotation of a shaft 100. Expended steam is discharged from the expansion unit 96 through a steam discharge pipeline 102 into a condenser 104 in which the steam is cooled and converted into water. Water thus produced in the concenser 104 is fed through a water recirculation pipeline 106 to a pump 108 from which water is pumped into the heat-exchange pipeline 92 in the evaporator unit 86 through a water feed pipeline 110. The pump 108 is driven from the expansion unit 96 through a coupling shaft 112. To start the pump 108 from a rest condition, the pump 108 is provided with a starting means which is herein shown as comprising a starter motor 114 drivably connected to the pump 108 through suitable coupling means such as a 116. The clutch 116 is arranged so as to engage when starting the engine from a rest condition, and disengage when the expansion unit 96 becomes operative to drive the shaft 112.

A continuous supply of water thus recirculated through the heat-exchange pipeline 92 in the evaporator unit 86 is transformed into steam so as to continuously drive the shaft 100 as hot working gases are passed into the casing 88 from the duct 84 and expelled through the outlet port 88b of the casing 88. Exhaust gases expelled from the evaporator unit 86 consist essentially of carbon dioxide and water vapour so that they may be discharged to the open air either directly or through a heat exchanger 118. The exhaust tube 90 and pipeline 110 pass through the heat exchanger 118 in such a way that residual heat in the exhaust gases passing through the exhaust tube 90 is partially transferred to the pipeline 110 for preheating water to be fed into the heat-exchange pipeline 92 in the evaporator unit 86. Likewise, exhaust steam from the expansion unit 96 may be discharged to the open air although it has been assumed to be condensed and recirculated to the evaporator unit 86.

Although combusted gases produced in the combuster unit 12 have heretofore been assumed to be diluted with water which is directly fed into the combuster unit 12, an alternate arrangement may be made so that water for diluting combusted gases is injected into the interior of the casing 88 of the evaporator unit 86 where desired. As indicated by an assembly drawn with broken lines in FIG. 5, such an arrangement may comprise an exhaust recirculation passageway 120 branched off from the exhaust tube of the evaporator unit 86. The exhaust recirculation passageway 120 terminates in a distribution chamber 122 formed around an upstream portion of the casing 88, and is in communication with the interior of the casing through a number of apertures or injection nozzles 124 formed in a wall portion defining the inner surface of the distribution chamber 122. The exhaust recirculation passageway 120 has incorporated therein a throttle valve or orifice 126, a blower or pump 128 and a flow control valve 130, so that the exhaust gases (which mainly consist of water vapour although they contain carbon dioxide in an appreciable amount) are recirculated from the exhaust tube 90 and forced into the distribution chamber 122 by means of the blower or pump 128 at a rate which is controlled by the flow control valve 130.

In recirculating exhaust gases to the evaporator unit 86, carbon dioxide gas may be separated from the exhaust gase mixture so as to increase the efficiency of dilution of combusted gases. FIG. 6 illustrates a steam engine incorporating an exhaust recirculating arrangement to achieve this end.

Referring to FIG. 6, a steam engine as shown is essentially similar to the embodiment illustrated in FIG. 5, and accordingly corresponding parts and units are designated by like reference numerals in both figures. The exhaust recirculation arrangement incorporated in the steam engine herein shown includes a condenser 132. An exhaust tube 90 terminates in the condenser 132 so that water vapour in exhaust gases discharged from an evaporator unit 86 are condensed into liquid water. This liquid water is copresent with carbon dioxide initially contained in exhaust gases expelled from the evaporator unit 86. The condenser 132 has an outlet which leads through a passageway 134 to a separator 136 in which carbon dioxide is extracted from the exhaust mixture and discharged to the open air through a discharge port 138. The water is then passed through a pipeline 140 to a water reservoir 142 and further through a pipeline 144 to a pump 146. The pump 146 pumps the water through a water feed pipeline 148 and a flow control valve 150 into a chamber 152 which is incorporated in a duct 84 leading between the combuster unit 12 and the evaporator unit 86. The chamber 152 is provided with a water injection nozzle 154 communicating with the water feed pipeline 148 so that water pumped from the pump 146 is injected into the chamber 152 at a rate which is controlled by the flow control valve 150. Hot combusted gases delivered from the combuster unit 12 are in this manner diluted with water while passing through the chamber 152 and resultant working gases have a suitable temperature of, for example, 1,200° to 1,600°C, and suitable volume.

The pump 146 thus used to forcibly recirculate water to the chamber 152 is driven from a steam expansion unit 96 by a coupling shaft 156 connected to a shaft 112 which connects the expansion unit 96 to a pump 108 in the steam recirculation arrangement previously described with reference to FIG. 5. To start the pumps 108 and 146 from a rest condition in which the expansion unit 96 is inoperative, suitable starter means are provided which are shown to include a starter motor 158 and a clutch 160 through which the starter motor 158 is arranged to be drivably connected through the clutch 160 to the pumps 108 and 146 when the expansion unit 96 is inoperative, and disconnected when the expansion unit 96 is operating.

It is apparent that the exhaust recirculation arrangement above described may open into the combuster unit 12 where desired. In this instance, the water injection nozzle 154 may project into the combustion chambers 16 of the combuster units 12 shown in FIGS. 2 or 4, or into an annular water distribution passageway 76 of a combuster unit 12 shown in FIG. 3.

As previously mentioned, a copious amount of water vapour is produced as a result of the decomposition of hydrogen peroxide and the combustion of fuel. This is supplemented by injection of water into combusted gases so that the working gases finally delivered to the evaporator units 86 of the steam engines shown in FIG. 5 or 6 contain water vapour in a major proportion. Thus, working gases supplied from the combuster unit 12 may be utilized directly as a fluid for driving a mechanical power producing member of an engine without using an evaporator unit or other units such as a pump or heat-exchange pipeline which are utilized in combination with an evaporator unit, a preferred embodiment of a steam engine achieving this end being illustrated in FIG. 7.

Referring to FIG. 7, a steam engine hereby shown includes a steam expansion unit 162 into which a duct 84 leading from a combuster unit 12 terminates. The steam expansion unit 162 has an outlet (not shown) which is in communication through a passageway 164 with a condenser 132 of an exhaust recirculation arrangement described with reference to FIG. 6. Thus, combusted gases passing through the duct 84 from the combuster unit 12 pass through a chamber 152 in which they are mixed with water injected into the chamber 152 from a water injection nozzle 154. A copious amount of steam mixed with an appreccable amount of carbon dioxide is produced in the chamber 152 and in the duct 84 downstream of the chamber 152. This steam mixture is supplied to the steam expansion unit 162 and adiabatically expands to drive a mechanical power producing member (not shown) and rotate an output shaft 166. Expended steam is discharged through the passageway 164 to a condenser 132 for condensation into liquid water. The liquid water and carbon dioxide gas copresent therewith are fed to a separator 136 from which carbon dioxide gas is discharged to the open air through a discharge port 138. The liquid water is then passed to a pump 146 through a water reservoir 142, and is pumped to the water injection nozzle 154 through a flow control valve 150. A pump 146 is driven by the steam expansion unit 162 through a coupling shaft 168 during operation of the engine, and from a starter motor 158 through a clutch 160 during starting of the engine.

Since combusted gases delivered from the combuster unit 12 are directly used as a working fluid to drive the expansion unit 162, a steam engine of this configuration can dispense with an evaporator unit so that a simplified and small-sized overall configuration can be achieved of a steam engine shown in FIG. 7.

Figure 8:
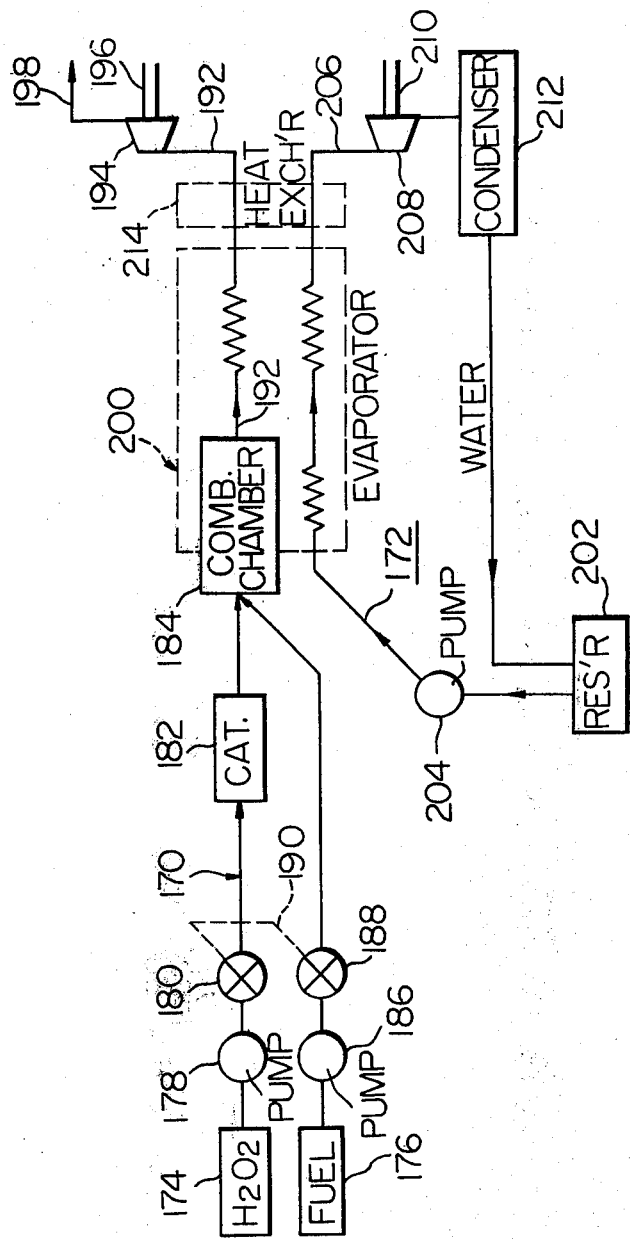
FIG. 8 is a diagrammatic view showing a general configuration of a steam and has hybrid power plant which incorporates a modified arrangement of a fuel burning apparatus having a general constructional arrangement illustrated in FIG. 1.

FIG. 8 schematically illustrates a preferred overall construction of a gas and steam hybrid power plant in which heat energy resulting from the combustion of fuel is divided for driving independent driven members of the power plant.

Referring to FIG. 8, the gas and steam hybrid power plant consists of a gas driven or internal combustion engine unit and a steam driven engine unit which are generally designated by reference numerals 170 and 172, respectively. The gas driven unit 170 is constructed essentially similar to a combuster unit 12 shown in FIGS. 2 to 4, including a source 174 of liquid hydrogen peroxide and a source 176 of a fuel which in this instance is assumed to be a liquid or gaseous fuel such as kerosene, heavy oil, gasoline, or liquefied petroleum or hydrogen gas. Liquid hydrogen peroxide is delivered from the source 174 by means of a pump 178 and passes through a flow control valve 180 to a catalyst 182 of, for example, a silver-based material as previously noted. The catalyst 182 is active to exothermically decompose hydrogen peroxide for supplying a hot mixture of water vapour and oxygen gas to a combustion chamber 184. Simultaneously with the production of oxidizing gases, fuel from the source 176 is pumped by a fuel feed pump 186 and passes through a flow control valve 188 to the combustion chamber 184 where the fuel is mixed with and combusted in the presence of hot oxidizing gases supplied from the catalyst 182. Hot combusted gases are thus produced in the combustion chamber 184. Where desired, the flow control valves 180 and 188 may be controlled through a common mechanical or other linkage so that fuel and hydrogen peroxide are fed to the combustion chamber at a predetermined ratio. The combusted gases thus produced are delivered through a gas feed passageway 192 into a gas expansion unit 194 for driving a first mechanical member 196 of the power plant. Exhaust gases from the expansion unit 194 may be discharged to the open air through an exhaust tube 198.

The steam-operated unit 172, on the other hand, includes an evaporator 200 having heat-exchanging means which are in contact with the gas feed passageway 192. The evaporator 200 is supplied with water from a water reservoir 202 through a water feed pump 204 so that water is transformed into steam as it passes through the evaporator 200. Steam is then fed through a steam feed passageway 206 into a steam expansion unit 208 for driving a second mechanical member 210 of the power plant. Expended steam is discharged from the expansion unit 208 into a condenser 212 for condensation into liquid water, which is then recirculated to the water reservoir 202.

The first and second mechanical members 196 and 210, respectively, may be turbine rotors with connected shafts. The shafts may be drivingly connected to a common output member or respective output members cooperating with each other, or to output members operating independently.

Where desired, an additional heat-exchanger 214 may be provided which provides communication between the combusted gas and steam feed passageways 192 and 206 respectively, downstream of the heat exchanging means in the evaporator 200 so that steam emerging from the evaporator 200 is further heated before it reaches the steam expansion unit 208.

Figure 9:
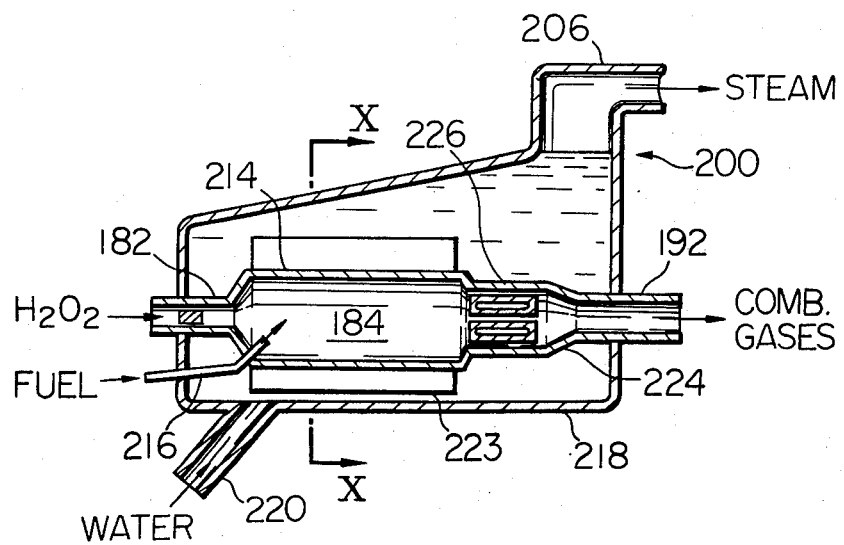
FIG. 9 is a longitudinal sectional view which shows an essential component of a preferred embodiment of a steam and gas hybrid power plant of the general construction illustrated in FIG. 8.
Figure 10:
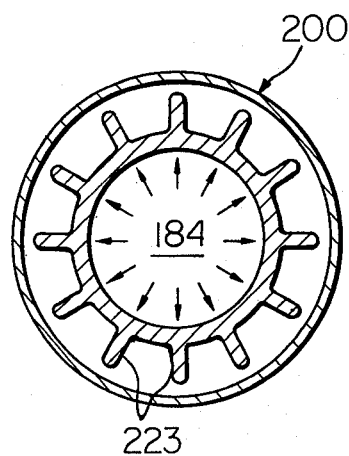
FIG. 10 is a cross sectional view taken through a line X—X of FIG. 9.

An example of a practical configuration of a gas and steam hybrid power plant above described is now illustrated in FIGS. 9 and 10, wherein only the combustion chamber 184, the evaporator 200 and the parts directly connected therewith are illustrated for brevity of illustration.

Referring to FIGS. 9 and 10, a combustion chamber 184 is defined by a combustion cylinder 214 having an inlet port (no numeral) communicating with a flow control valve 180 (FIG. 8) through a catalyst 182 and an outlet port (no numeral) which communicates into a gas feed passageway 192. A fuel injection nozzle 216 leads from a flow control valve 188 (FIG. 8) and projects into the combustion chamber 184 whereby fuel injected into the combustion chamber 184 by the nozzle 216 is combusted in the presence of a hot mixture of water vapour and oxygen gas produced through exothermic decomposition of hydrogen peroxide in the presence of the catalyst 182 as previously explained. Hot combusted gases thus produced in the combustion chamber 184 pass into the gas feed passageway 192 for eventually driving a gas driven mechanical member 176 (FIG. 8) of a power plant. An evaporator 200 comprises a vessel 218 into which a water inlet passageway 220 communicating with a water reservoir 202 through a water feed pump 204 (FIG. 8) opens for supplying water into the vessel 218. The combustion cylinder 214 is so positioned within the vessel 218 as to be in contact with or immersed in water with which the vessel 218 is continuously supplied from the water reservoir 202, whereby water in the vessel 218 is heated into steam. The vessel 218 is thus provided at its top portion with a steam outlet port (no numeral) which leads to a steam feed passageway 206 so that steam rising out of heated water in the vessel 218 is channeled to an expansion unit 208 through the steam feed passageway 206 for driving a steam driven mechanical member 210 of the power plant. In order to promote vapourization of the water in the vessel 218, the combustion cylinder 214 has formed on its outer peripheral wall a number of heat-exchanging elements or fins 223 and, where desired, the combustion cylinder 214 may have an extension 224 incorporated between the combustion chamber 184 and the combustion gas feed passageway 192 for increasing the effective area over which water in the vessel 218 can be heated by combusted gases produced in the combustion chamber 184. The extension 224 may comprise a multiplicity of pipes 226 through each of which is passed water from the vessel 218.

Combusted gases initially produced in the combustion chamber 184 have a temperature higher than 2,000°C as previously mentioned. If the combusted gases are used only for driving a gas driven mechanical member of a power plant such as a gas turbine, it will be required that expansion of combusted gases be accomplished in stages through use of a complex energy conversion mechanism, with a resultant loss of heat energy, and to have the component parts of the combuster unit and gas turbine protected by or formed of costly refractory materials. If, on the contrary, the heat energy from combusted gases is solely used to convert water into steam for driving a steam driven mechanical member of a power plant such as a steam engine, then a heat exchanger unit of an extremely large configuration will be indispensible in the power plant.

These problems are eliminated in the gas and steam hybrid power plant of a configuration herein described because part of the thermal energy derived from combusted gases is utilized for driving gas driven mechanical member of a power plant and part for producing steam for driving a steam driven mechanical member of a plant. The combustion cylinder and other parts and elements incorporated therewith are continuously cooled through transfer of heat between combusted gases and water contacting the combustion cylinder and, therefore, need not be protected by or formed of expensive refractory materials.

Output mechanical power produced by the gas and steam driven units may either be combined to drive a common driven member or transmitted to independently driven members. Where a hybrid power plant according to the present invention is utilized as a driving power source for a motor vehicle, the gas and steam driven members may be connected through gearing or a hydraulic torque converter to a driveline of the motor vehicle. In this instance, hydrogen peroxide and fuel may be supplied to the combustion chamber at reduced rates during idling for reducing the quantity of combusted gases. Under this condition, thermal energy derived from combusted gases can be mainly utilized for producing steam so that the motor vehicle can be driven at a relatively low speed by the steam driven member of the hybrid power plant. This will contribute to solution of problems of emission of hot exhaust gases and excessive noise which are experienced when a motor vehicle equipped with a conventional gas turbine engine turns a corner or cruises at low speed. Since, moreover, hot oxidizing gases produced as a result of exothermic decomposition of hydrogen peroxide have an extremely high oxidizing effect on fuel, flames from the combustion chamber will not blow out into the open air even though the feed rate of fuel and hydrogen peroxide are reduced to relatively low levels. Thus, the idling speed of an engine for a motor vehicle according to the present invention may be considerably lower than that of a conventional gas or steam turbine engine. For starting or accelerating the motor vehicle, the supply rates of fuel and hydrogen peroxide may be increased rapidly so that combusted gases are produced at a rapidly increased rate. Under these conditions, the vehicle is driven from by the gas driven member of the hybrid power plant in such a way that any time lag which might be experienced as a result of driving the motor vehicle from a steam driven power plant is effectively eliminated.

What is claimed is:

1. A steam engine comprising a combustion chamber, fuel feeding means for feeding a fuel into said combustion chamber, oxidizer feeding means for feeding into said combustion chamber hot oxidizing gases produced through exothermic decomposition of hydrogen peroxide for promoting burning of said fuel in said combustion chamber and consequently producing hot combusted gases, first water feeding means for injecting water into said combusted gases for producing working gases having a suitable end predetermined temperature and volume, an evaporator unit including an evaporation chamber communicating with said combustion chamber for receiving said working gases and at least one heat-exchange pipeline passing through said evaporation chamber, second water feeding means for feeding water into said heat-exchange pipeline for producing steam in said pipeline as water is passed through said pipeline, and a steam expansion unit having an inlet end leading from an outlet end of said pipeline for allowing said steam to expand and produce a driving force.

2. A steam engine as claimed in claim 1, further comprising water recirculating means for converting into water steam discharged from said steam expansion unit and recirculating said water into said heat-exchange pipeline.

3. A steam engine as claimed in claim 2, in which said water recirculating means comprise a condenser communicating with an outlet end of said steam expansion unit for condensing into water steam discharged from said outlet end of said expansion unit and a pump for pumping water from said condenser into said heat-exchange pipeline.

4. A steam engine as claimed in claim 3, in which said pump is driven from said steam expansion unit.

5. A steam engine as claimed in claim 1, further comprising exhaust recirculating means for at least partially recirculating exhaust gases from said evaporator unit into said first water feeding means for injecting at least part of said recirculated exhaust gases into said combusted gases before said combusted gases are fed into said evaporator unit.

6. A steam engine as claimed in claim 5, in which said exhaust recirculating means comprise an exhaust recirculating passageway leading from an outlet end of said evaporator unit.

7. A steam engine as claimed in claim 6, in which said outlet end of said evaporator unit partially communicates with the air so that a part of the exhaust gases from said evaporator unit are discharged to the open air, and a part are directed into said exhaust recirculating passageway.

8. A steam engine as claimed in claim 6, in which said evaporator unit is totally in communication with said exhaust recirculating passageway through said outlet end.

9. A steam engine as claimed in claim 6, in which said exhaust recirculating means further comprise a separator provided in said exhaust recirculating passageway for extracting and discharging to the open air carbon dioxide gas from said recirculated exhaust gases in said passageway and passing residual exhaust gases into said first water feeding means.

10. A steam engine as claimed in claim 9, in which said exhaust recirculating means further comprise a condenser incorporated between said outlet end of said evaporator unit and said separator for condensing water vapour contained in said recirculated exhaust gases into liquid water before said exhaust gases are passed into said separator.

11. A steam engine as claimed in claim 6, in which said first water feeding means comprise a pump having an inlet end communicating with said exhaust recirculating passageway for forcibly injecting recirculated exhaust gases into said combusted gases.

12. A steam engine as claimed in claim 11, in which said pump is driven from said steam expansion unit.

13. A steam engine as claimed in claim 1, in which said first water feeding means include at least one water injection nozzle projecting into said combustion chamber for mixing said combusted gases with water injected into said combustion chamber.

14. A steam engine as claimed in claim 1, in which said first water feeding means include a chamber incorporated between an outlet end of said combustion chamber and an inlet end of said evaporator unit and at least one water injection nozzle projecting into said chamber for mixing said water with said combusted gases passing through said chamber.

* * * * *